United States Patent
Sinclair

[15] 3,645,409
[45] Feb. 29, 1972

[54] LOAD TRANSFER AND PALLET STACKER

[72] Inventor: Stuart W. Sinclair, Houston, Tex.

[73] Assignee: Anderson, Clayton & Co., Houston, Tex.

[22] Filed: Mar. 9, 1970

[21] Appl. No.: 17,749

[52] U.S. Cl. ...................214/6 BA, 214/41, 214/310
[51] Int. Cl. .................................B65g 57/30, B65g 67/04
[58] Field of Search...............214/44, 6 P, 6 BA, 301, 38 CC, 214/310, 41

[56] References Cited

UNITED STATES PATENTS

| | | | |
|---|---|---|---|
| 2,394,692 | 2/1946 | Isler | 214/44 X |
| 2,394,693 | 2/1946 | Golrick | 214/152 |
| 2,536,883 | 1/1951 | McDonald et al. | 214/44 |
| 2,574,394 | 11/1951 | Isler | 214/44 |
| 2,792,950 | 5/1957 | Fenton et al. | 214/6 BA |
| 3,074,595 | 1/1963 | Boller | 214/6 P UX |
| 3,499,560 | 3/1970 | LeGros | 214/6 P UX |
| 3,502,231 | 3/1970 | Raynor et al. | 214/6 P |

*Primary Examiner*—Gerald M. Forlenza
*Assistant Examiner*—Robert J. Spar
*Attorney*—James F. Weiler, Jefferson D. Giller, William A. Stout, Paul L. DeVerter, II, Dudley R. Dobie, Jr. and Henry W. Hope

[57] ABSTRACT

A load transfer and pallet stacker for use with a platen bearing lift truck, whereby a load is transferred from a pallet directly on to the platen, and the pallet is vertically stacked. A traction plate, transfer unit and elevator unit are interconnected to make the device portable. Push-pull and push only truck-operated units are described, as well as a power-operated unit.

7 Claims, 25 Drawing Figures

Stuart W. Sinclair
INVENTOR.

BY Dudley R Dobie Jr

ATTORNEYS

Stuart W. Sinclair
INVENTOR.

BY Paul L. DeVerter II

ATTORNEYS

LOAD TRANSFER AND PALLET STACKER

BACKGROUND OF THE INVENTION

The present invention relates to an improved load transfer and pallet stacker, and more particularly, to a device for transferring a load, such as cartons, bags, or other similar commodities, from a lift truck pallet to the platen of a lift truck while at the same time stacking the pallet with other similar pallets after the load has been removed. The invention may also be used to transfer the load from a first pallet to a second pallet, or from a pallet to a slipsheet.

The concept of unloading pallets on to the platen of a forklift truck by shoving the loaded pallet through the opening in a wall is well known. Further, the concept of stacking empty pallets vertically, with a bottom inserter, by means of an elevator mechanism is similarly known. Both lift truck and power-actuated load transfer devices are illustrated in the patents to Golrick, U.S. Pat. No. 2,394,693 and Isler, U.S. Pat. No. 2,394,692. A typical pallet stacking device is illustrated in the patent to Fenton, U.S. Pat. No. 2,792,950.

SUMMARY

The load transfer and pallet stacker of the present invention generally includes a traction plate, a stacker unit, and a transfer unit. The use of the traction plate, as hereinafter described, makes the load transfer and pallet stacker of the present invention portable, and eliminates the need for this device to be fastened to the floor by anchor bolts, or the like. The traction plate may be eliminated if portability is not desired. The stacker unit packages the pallets for easier handling and for storage. The transfer unit not only transfers the load from the pallet to the platens of the lift truck, but also quickly removes the pallet. The load transfer and pallet stacker of the present invention may be operated by the lift truck, in which instance all of the energy necessary for operation of the various mechanisms is supplied by the lift truck itself; or the invention may be powered by a self-contained power unit built into the load transfer and pallet stacker. The invention also includes various subcombinations.

In handling goods in warehouses, it is common to stack the goods on a pallet, so that a lift truck might carry the boxes, bags or the like, without damaging them. In some instances the goods are shipped on the pallets for ease of unloading at the receiving end. However, pallets are relatively expensive, and a company usually requires a deposit for the pallets which it ships, and is without the use of the pallets until they have been returned. Consequently, it is the practice in many industries to ship the goods without a pallet and to do this some means for transferring the load from a pallet onto the lift truck fork or platen is necessary. Further, some means is necessary to stack the various unloaded pallets, if for no other reason than to reduce the floor space occupied by them. The present invention is directed to such an improved load transfer and pallet stacker. Further, the present invention may be utilized to transfer the load from a first pallet to a second pallet of a different size, or different orientation. Also, the present invention may be utilized to transfer the load from a pallet to a slipsheet.

It is, thus, an object of the present invention to provide a load transfer and pallet stacker which is not only effective in stacking empty pallets but also in transferring the load therefrom, and is also self-contained and portable, and need not be permanently affixed to the floor, and thus may be readily moved to any location desired.

It is a further object of the present invention to provide a load transfer and pallet stacker which may be entirely self-contained and operated by the lift truck in one embodiment, and which is power operated in another embodiment. In this latter instance, the invention is not limited to the tractive effort of the truck. Further, lift truck maneuvering is simplified, right-angle transfers are possible, and small noncounter weighted pallet handlers may be utilized.

Other and further objects, features and advantages will be apparent from an examination of the following description of the present preferred embodiments of the invention, given for the purpose of disclosure, when taken in conjunction with the accompanying drawings.

BRIEF DESCRIPTION OF THE DRAWINGS

Like character references designated like parts throughout the several views of the drawings.

DESCRIPTION OF THE PREFERRED EMBODIMENTS

Figure 1:
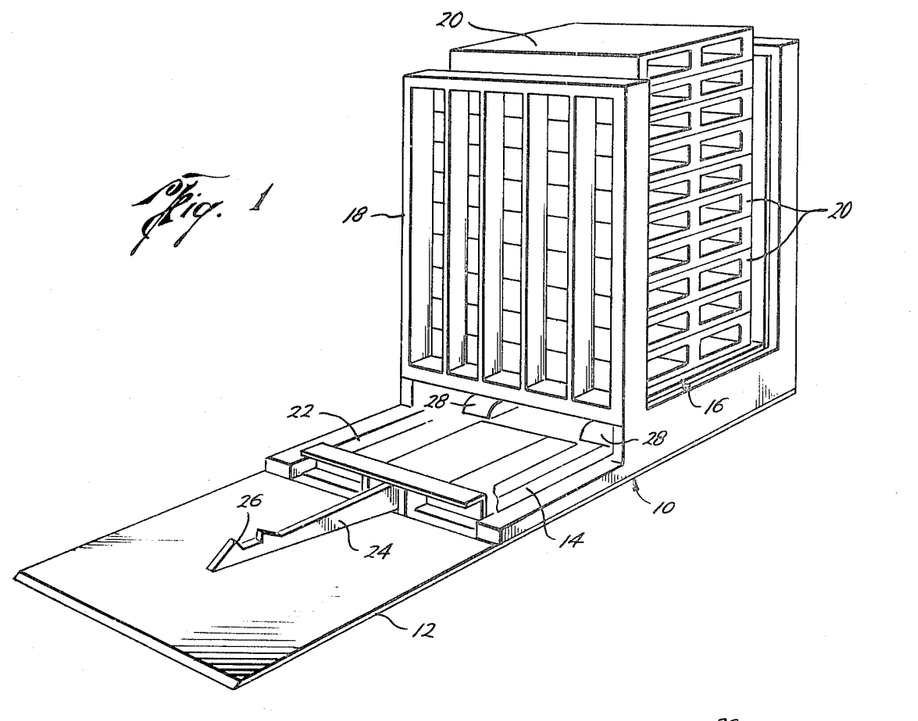
FIG. 1 is a perspective view of the load transfer and pallet stacker of the present invention utilizing the truck-operated embodiment having a tongue extending from the transfer unit which is both pushed and pulled by the lift truck.

Referring now to FIG. 1 the reference numeral 10 generally refers to the load transfer and pallet stacker of the present invention which includes a traction plate 12, transfer unit 14 and elevator unit 16. Mounted vertically on the elevator unit 16 is a load-contacting face 18 and shown stacked on the elevator unit are a number of pallets 20.

Forming a part of the transfer unit 14 is a transfer car 22, and extending from the car is a tongue 24 having a latch 26 at the end thereof. At the bottom of the elevator unit 16 are lifting bars 28.

Figure 2:
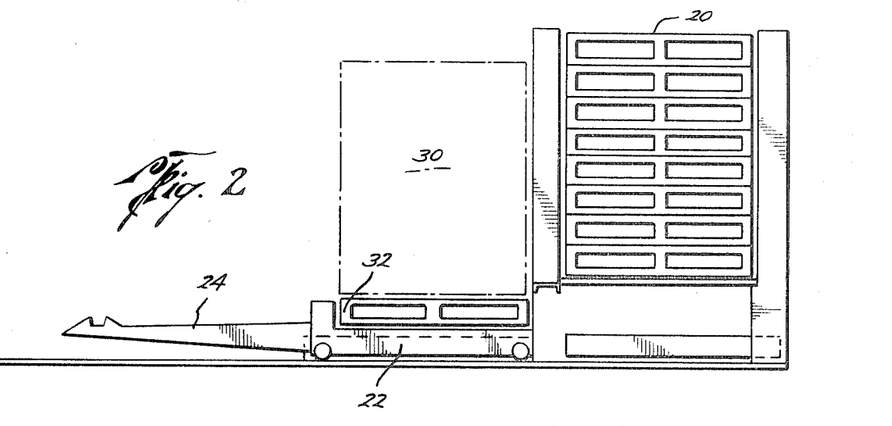
FIG. 2 is a generalized side view of the invention shown in FIG. 1, FIGS. 3-8 are views similar to FIG. 2 illustrating the sequence of operation.

Referring now to FIG. 2, a load 30 which may consist of a load of boxes, bags or other goods, is resting on a pallet 32 which has been placed on the transfer car 22.

Figure 3:
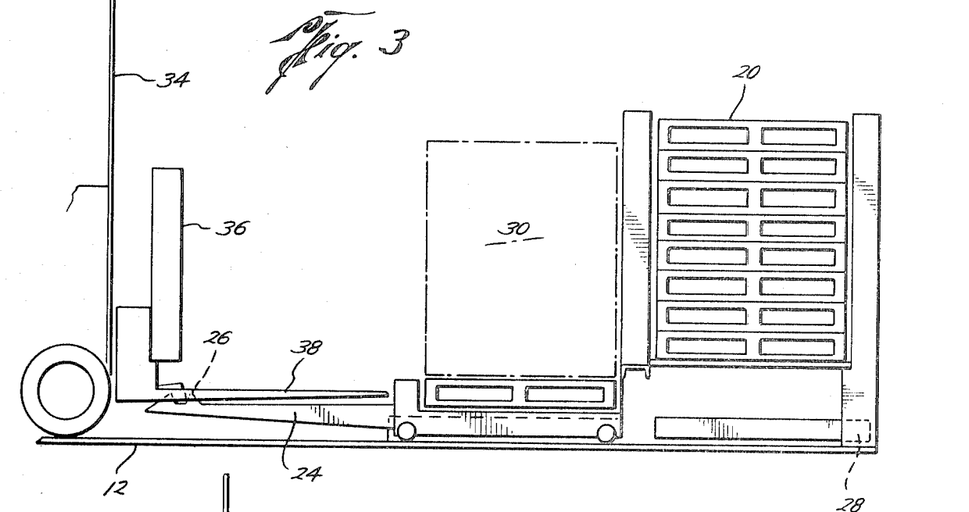

As seen in FIG. 3, a lift truck 34 having an attached push-pull plate 36 and empty platen 38 is driven onto the traction plate 12. The truck 34 is aligned with the tongue 24 so that the latch 26 engages an appropriate eye located on the truck.

Figure 4:
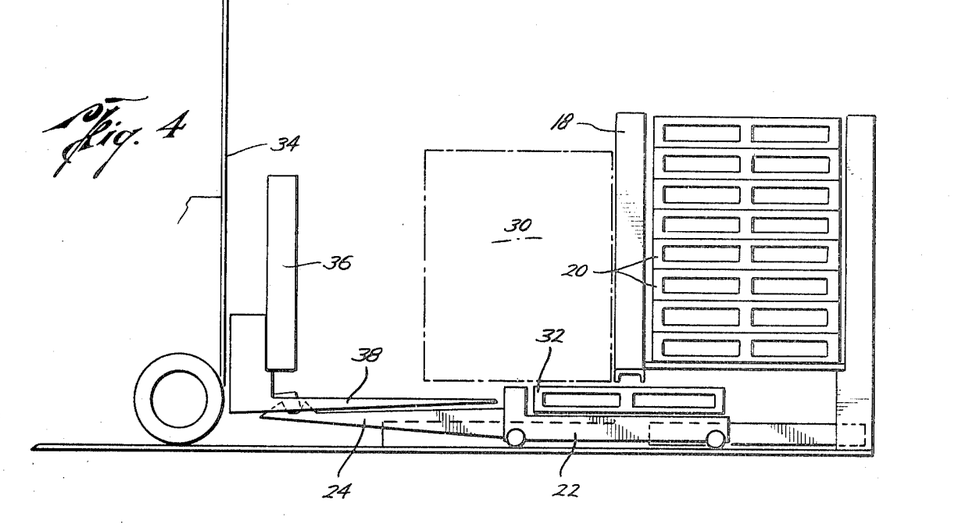

As seen in FIG. 4, the truck 34 is advanced over the traction plate 12 and the load 30 is transferred from the pallet 32 to the platen 38 as the transfer car 24 is pushed under the load-containing face 18.

Figure 5:
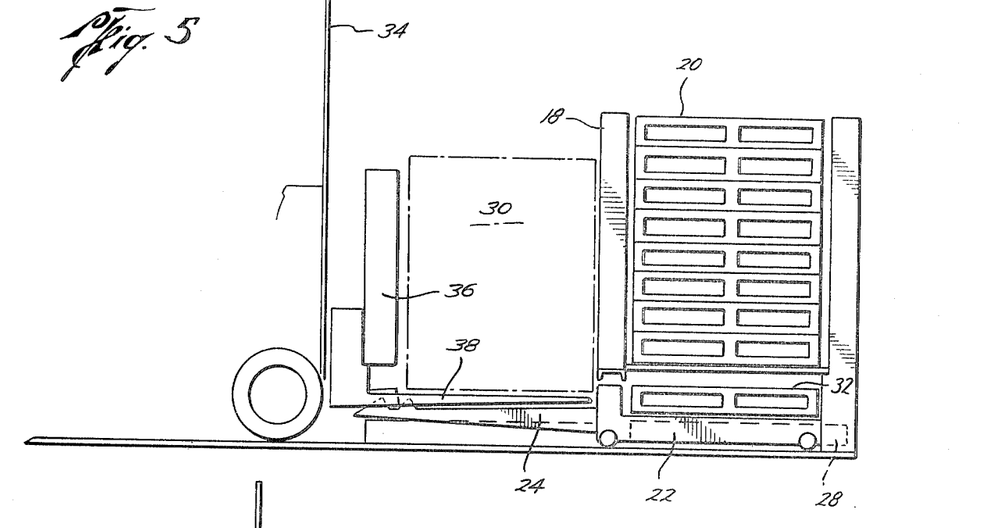

As seen in FIG. 5, the pallet 32 has been positioned by the transfer car 22 directly below the previously stacked pallets 20 and over the lifting bars 28, while at the same time the truck 34 has fully advanced, and the load 30 has been transferred from the pallet 32 to the platens 38.

Figure 6:
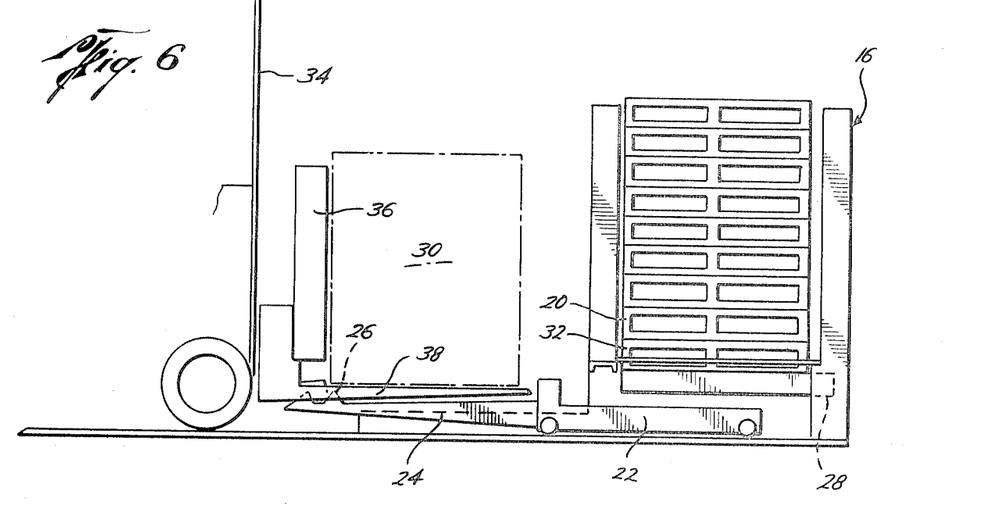

FIG. 6 shows the truck 34 reversed, and pulling the transfer car 22 from the elevator unit 16 by the tongue 24 and latch 26. This action results in the lifting bars 28, raising the pallet 32 into the bottom of the stack of pallets 20.

Figure 7:
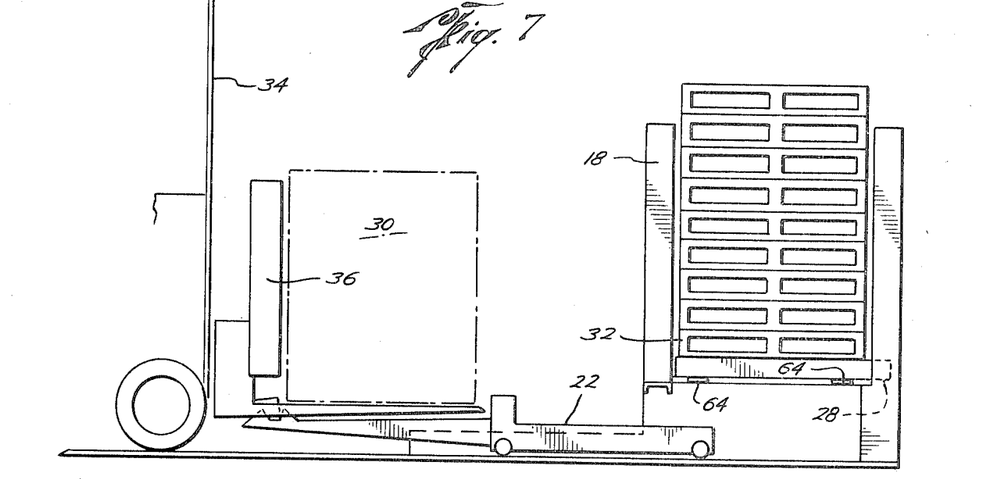

As seen in FIG. 7, as the truck 34 continues to pull backwardly, the transfer car 22 is pulled out and the lifting bars 28 raise the entire stack of pallets 20, including the just emptied pallet 32, above hinged plates or dogs 64 which support the stack of pallets 20.

Figure 8:
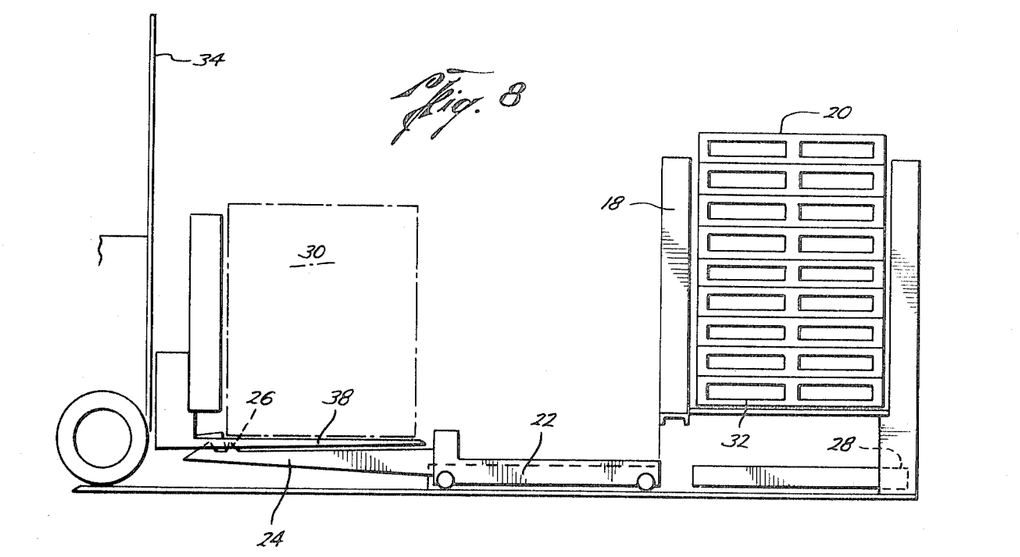

As seen in FIG. 8, the transfer car 22 has returned to its normal position, as have the lifting bars 28, and the final reverse movement of the truck 34 disengages the truck from the latch 26 on the tongue 24. The transferred load 30 now rests on the platens 38 and may be deposited by the operator of the truck 34, as desired. The transfer car 22 is in position to receive another pallet load of material.

Figures 10, 11:
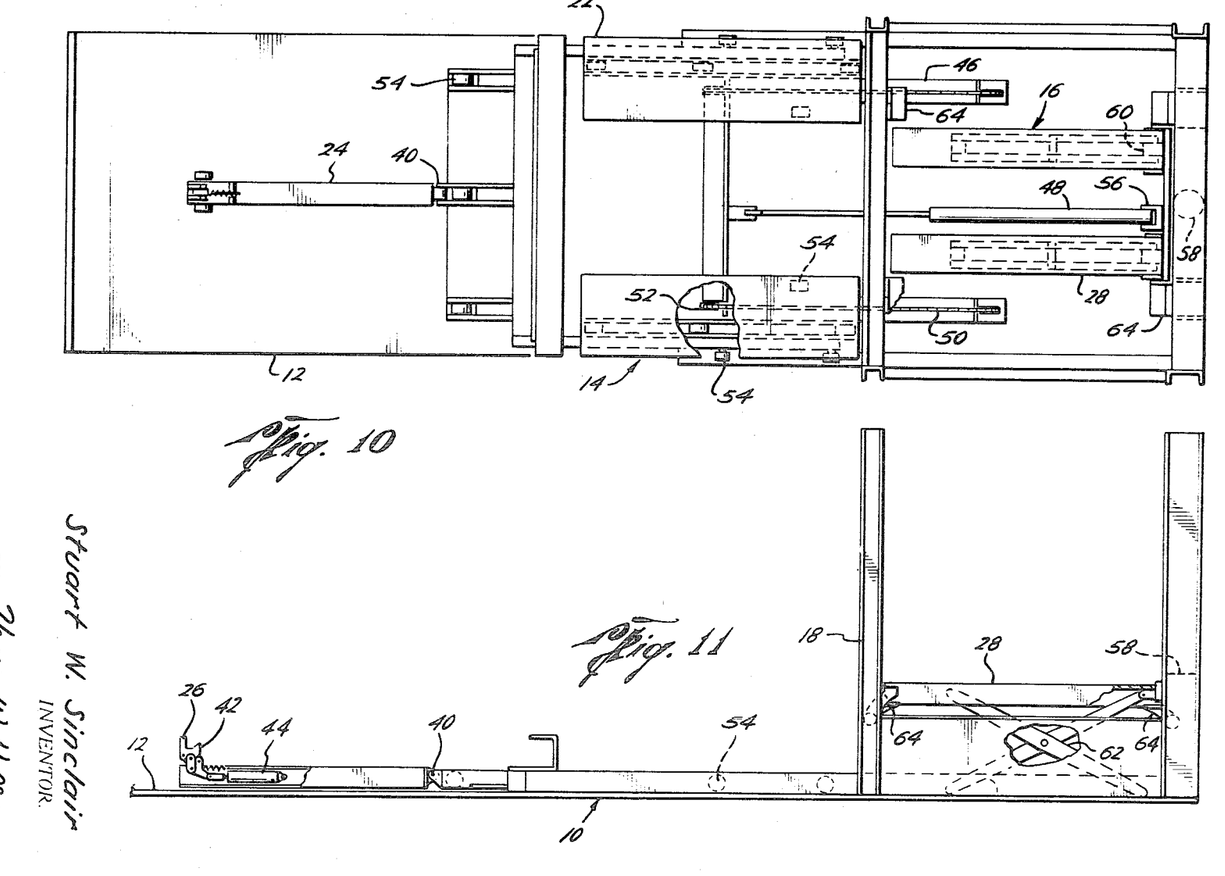
FIG. 10 is a top view of the embodiment shown in FIG. 1.
FIG. 11 is a side view of the embodiment shown in FIG. 10.

Referring now to the FIGS. 10 and 11, top and side views showing the details of the apparatus described in FIGS. 1 through 8 are shown. Notice that the traction plate 12 extends under the transfer unit 14 as well as under the elevator unit 16, to which it is suitably attached. The tongue 24 is pivotally attached to the transfer car 22 by pivot 40 to allow for variations in heights of lift trucks. The latch 26 includes a locking dog 42 actuated by hydraulic latch cylinder 44 to prevent premature disconnection of the lift truck from the load transfer and pallet stacker 10. The transfer unit 14 includes not only transfer car 22, but also an intermediate carriage 46 to which is connected the power cylinder 48. The transfer car 22 is mechanically interconnected with the intermediate carriage 46 by means of chains 50 and sprockets 52 whose functions are to reduce the necessary stroke of the ram entering the power cylinder 48 while at the same time making the movement of the transfer car 22 proportional to the ram stroke. Both the transfer car 22 and intermediate carriage 46 roll on suitable roller, such as rollers 54, although other suitable means for support and guiding may be utilized. The power cylinder 48 is attached to the elevator unit 16 as by the pivotal connection 56.

The lifting bars 28 are suitably attached to the lifting ram 58 and guided in a vertical direction by the guide 60. A scissors mechanism 62 may be utilized to help maintain the lifting arms horizontal. Support dogs 64 are pivotally attached to the frame of the elevator unit 16, and are so designed to support a stack of pallets 20, such as seen in FIG. 1, and yet pivot upwardly to allow the upward passage of a recently unloaded pallet 32 when the lifting bars 28 are actuated upwardly. Further mechanical details are illustrated with one of the further embodiments described hereinafter.

Figure 9:
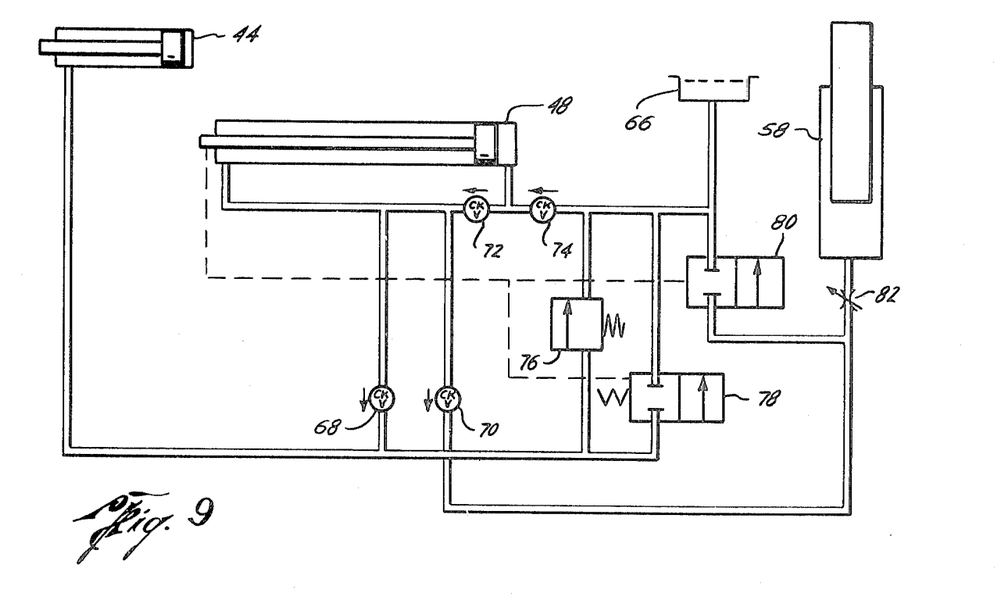
FIG. 9 is a schematic of the hydraulic circuit of the embodiment shown in FIG. 1.

Referring now to FIG. 9, a schematic of the hydraulic circuitry of the load transfer and pallet stacker 10 is shown. The various circuit elements are conventional, and are illustrated with conventional hydraulic circuit symbols. These include the reservoir 66, check valves 68, 70, 72 and 74, release valve 76, selector valves 78 and 80, and variable restrictor valve 82. In the initial position, corresponding to that shown in FIG. 2, the following conditions prevail: latch cylinder 44 ram is fully extended to the lift. Power cylinder 48 ram is fully extended to the left. Lift cylinder 58 ram is fully collapsed into the cylinder. Valve 80 is shifted to the left and is thus open, hydraulically interconnecting the reservoir 66 and lift cylinder 58. Valve 78 is also shifted to the left, and is open, compressing the spring forming a part thereof.

When the cycle begins, the movement of the lift truck against the tongue causes the transfer car and then the intermediate carriage to compress the ram of the power cylinder 48. This results in the primary flow of hydraulic fluid out of the cylinder end of power cylinder 48 through check valve 72 and 68 into the ram side of latch cylinder 44, as well as into the ram side of power cylinder 48. Because of the mechanical interconnection, valve 78 immediately switches to the right, closing itself. A minor amount of fluid flows through check valve 70, and valve 80 to the reservoir 66. The movement of the latch ram locks the lift truck to the latch and tongue 24.

As the load transfer phase progresses, there is a relatively free flow of hydraulic fluid from the head end of the power cylinder 48 to the rod end thereof, however, oil in the amount of the rod or ram displacement, after closing the latch, is released into the reservoir through valve 80, as well as through release valve 76.

At the end of the inward movement of the transfer car 24, hydraulic switch 80 is moved to its closed position by a mechanical interlock.

As the truck backs away, pulling out on the tongue 24, hydraulic fluid from the rod end of the power cylinder 48 flows through check valve 70 and restrictor valve 82 raising the lift cylinder 58 ram. At the same time, oil is sucked from the reservoir 66 through check valve 74 and to the head end of the power cylinder 48. During this time both valves 78 and 80 are closed.

A final reverse movement of the lift truck opens valves 78 and 80 through mechanical interlocks as the ram and the power cylinder 48 is pulled completely out. The shifting of the valves 78 and 80 to their open positions allows the lift cylinder 58 ram to descend, depositing the hydraulic fluid therein back in the reservoir through valve 80, and at the same time, allowing the spring-loaded latch cylinder 44 ram to extend, discharging the hydraulic fluid therein through valve 78 to the reservoir 66, thus unlocking the lift truck and completing the cycle of operations.

In the embodiment described above, the entire load transfer and pallet stacker 10 was operated with external power supplied by the lift truck 34 through the tongue 24 and more particularly upon the pushing and pulling of the tongue. Assuming, however, that the tractive effort of the lift truck 34 is sufficiently great, it is feasible to eliminate the tongue, and have all energy required for the operation of the load transfer and pallet stacker 10 supplied by the lift truck upon pushing its platen 38 against the face of the transfer car 22, and utilizing a mechanical spring or a hydraulic accumulator to store and then provide the power necessary to extend the transfer car and to lift the unloaded pallet 32 up into the stack of pallets 20. Mechanically, this embodiment is identical to the previously described embodiment, except that the tongue 24 and its latch assembly 26 are eliminated. Obviously, the traction plate 12 remains essential, unless, it is desired to bolt the load transfer and pallet stacker to the floor, in which case the traction plate 12 could be eliminated from all models of the invention.

Figure 12:
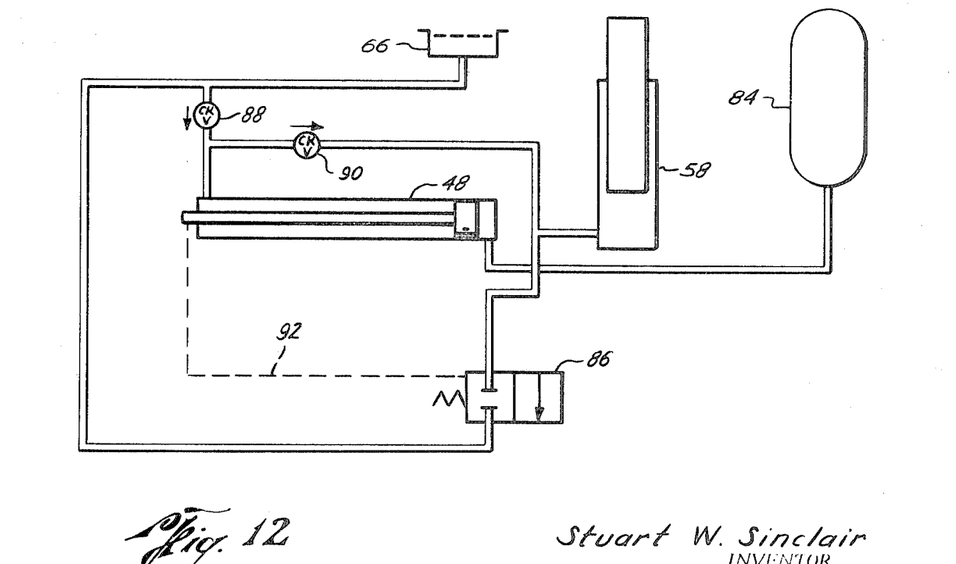
FIG. 12 is a schematic of the hydraulic circuit of an accumulator-operated embodiment of the invention.

Because of the mechanical similarity between the accumulator model and the tongue-operated model, only a hydraulic schematic is given of the accumulator embodiment, and reference is now made to FIG. 12 illustrating such embodiment. In its essentials, the accumulator-operated embodiment includes a power cylinder 48, the head end of which is hydraulically connected to an accumulator 84. The ram end of the power cylinder 48 is hydraulically connected through a check valve 88 to the reservoir 66 and through another check valve 90 to the lift cylinder 58 and to a selector valve 86. The selector valve is spring loaded and normally in the closed position. A mechanical interlock 92 moves the selector valve 86 to the open position when the ram of the power cylinder 48 is fully extended. The selector valve 86 also connects to the reservoir 66.

In operation, the lift truck platens engage the transfer car 22 pushing the extended ram of the power cylinder inwardly. This results in transferring hydraulic fluid from the head end of the power cylinder 48 into and charging the accumulator 84. At the same time, hydraulic fluid is drawn from reservoir 66 through check valve 88 into the rod end of the power cylinder 48. The lift cylinder 58 ram is fully retracted. After the load has been transferred from the transfer car on to the platens of the lift truck, and the empty pallet 32 is beneath the stack of stacked pallets 20, the lift truck is reversed and released for its further duties.

Upon removal of the lift truck, the accumulator 84 immediately forces the hydraulic fluid stored therein back into the head end of the power cylinder 48 causing the ram to begin to extend. As the ram of power cylinder 48 extends, it forces the hydraulic fluid contained in the ram end thereof through the check valve 90 into lift cylinder 58, causing the elevator to operate, thus lifting the empty platen 32 into the stack of loaded pallets 20. When the lift cylinder 58 ram has reached the end of its stroke, the dogs 64 retain the now unloaded pallet 32 in the stack of unloaded pallets 20. As the ram of the power cylinder 48 nears its extended position, it engages the mechanical interlock 92, which shifts valve 86 to its open position. This allows any remaining hydraulic fluid in the rod end of the power cylinder 48 to pass through the valve 86 into the reservoir 66, while at the same time allowing the lift cylinder 58 ram to retract, pushing the hydraulic fluid in said cylinder also through valve 86 to the reservoir 66. The cycle is thus complete, and ready for another pallet.

Figure 13:
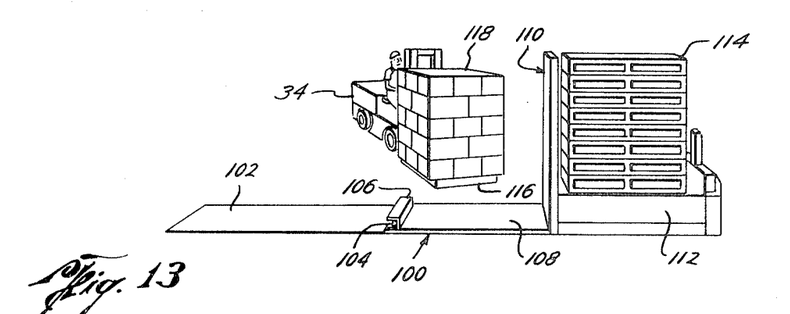
FIG. 13 is a generalized side view of a power-operated embodiment of the invention.

A still further embodiment of the present invention is illustrated in FIGS. 13 through 17 wherein the load transfer and pallet stacker 100 is power operated instead of being operated by the tractive effort of the lift truck 34. A power-operated load transfer and pallet stacker has several advantages over one which is truck operated, as described in the above embodiment, and these advantages are more fully set forth in the summary, supra. Referring now to FIG. 13, notice that the stacker 100 includes a traction plate 102, a switch bar 104, a thrust bar 106, a pallet receiving area 108, a transfer plate 110, an elevator assembly 112 and stack of empty pallets 114. As seen in FIG. 13, lift truck 34 carries a pallet 116 having a load 118 thereon up to the receiving area 108. The loaded pallet 116 is deposited in the receiving area 108.

Figure 14:
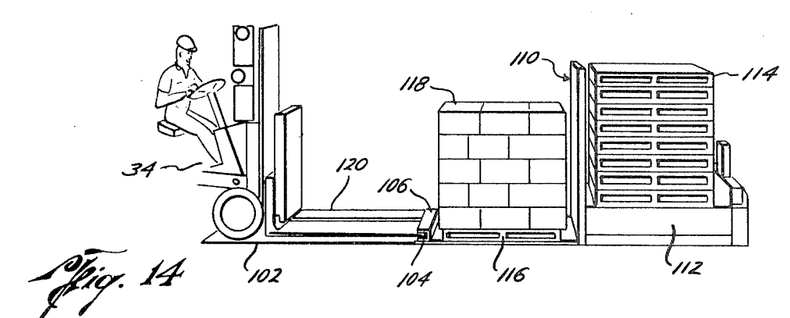
FIGS. 14-17 are view similar to FIG. 13 illustrating the sequence of operation.

Referring now to FIG. 14, the lift truck 34 has been driven onto the traction plate 102 with its platens 120 positioned behind the thrust bar 106 so that these platens 120 engage the switch bar 104. Engagement with the switch bar 104 begins the transfer and stacking cycle.

Figure 15:
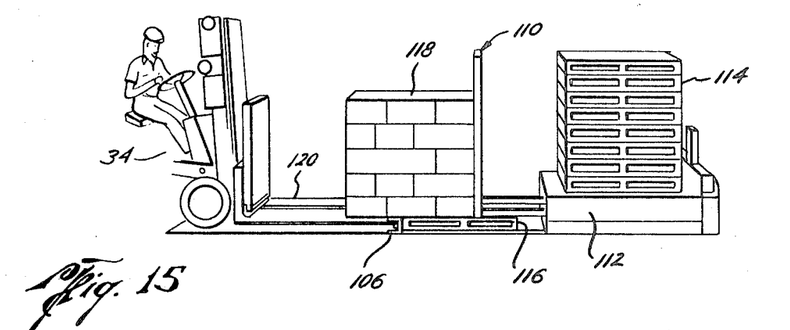

As seen in FIG. 15, the truck 34 merely sits still while the power-operated stacker 100 begins its cycle of operations. The transfer plate 110 extends from the elevator unit 112 pushing the load 118 and pallet 116 against the thrust bar 106. Further movement of the transfer plate 110 causes the load 118 to be pushed over the top of the thrust bar 106 and onto the platens 120 of the truck 34. A hinged, spring-loaded plate 112 (best seen in FIG. 16) is fixed to the lower front edge of transfer plate 110.

Figure 16:
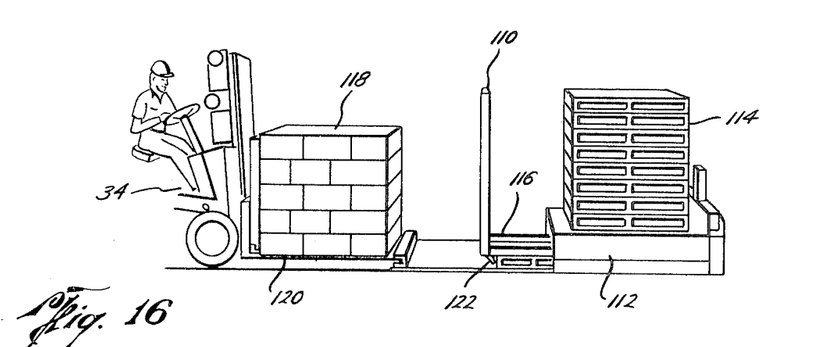

Referring now to FIG. 16, the load transfer is completed, and the load 118 now rests upon the platens 120 of the lift truck 34. The transfer plate 110 has moved past the end of the now unloaded pallet 116 and the hinged plate 122 has dropped down to engage the front edge of the pallet 116. The transfer plate 110, as seen in FIG. 16 is now pulling the now empty pallet 116 into the elevator unit 112. The lift truck 34 may now move the transfer load 118 to the desired location.

Figure 17:
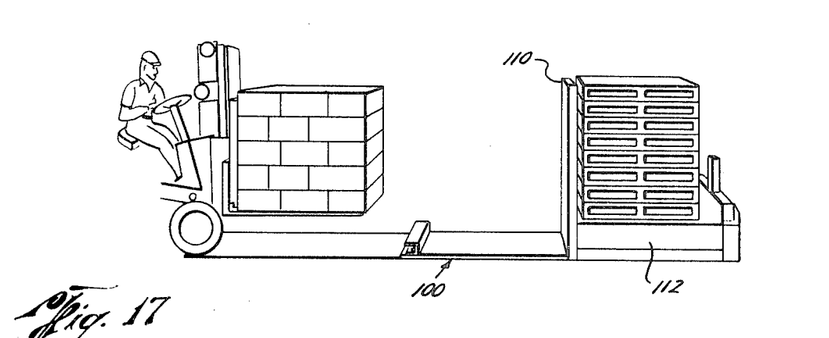

As seen in FIG. 17, the cycle is now complete, the unloaded pallet 116 having been pulled completely in to the elevator 112 by the transfer plate 110, and the stacker 100 is in condition for the receipt of another load pallet.

As soon as the now unloaded pallet 116 is within the elevator unit 112, it is lifted upwardly into the bottom of the stack of empty pallets 114, where it is retained by appropriate pivoted dogs. The elevator unit could also be operated at another time, such as moving a previously unloaded pallet upwardly at the same time the transfer plate 110 is extending, as in FIG. 15.

Figure 18:
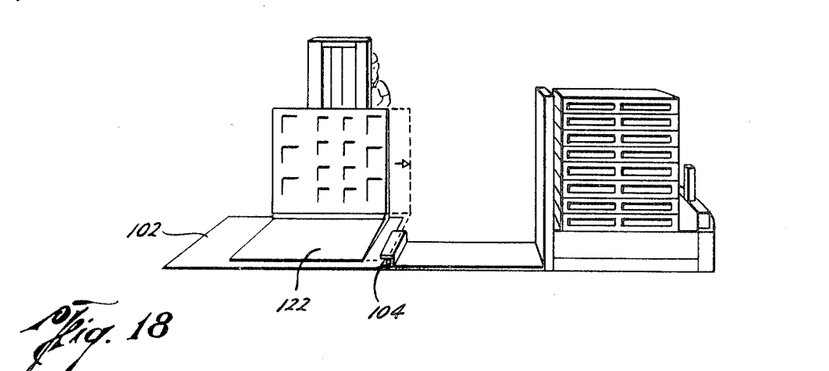
FIGS. 18 and 19 are views similar to FIG. 13 illustrating modifications thereto.

Turning now to FIG. 18, an alternative arrangement is shown wherein the load may be transferred to the platen of a truck without rotating the load 90° during transfer, as in the prior example. In this instance, the truck is required to have smooth platen 122, and as shown in dotted lines, the attachment on the truck must be capable of side shifting to actuate the switch bar 104. Further, the traction plate 102 needs to either be larger than that shown in FIG. 13, or it must be shifted toward the truck, so that it extends under the front wheels thereof. This is to keep the load transfer and pallet stacker 100 from shifting sideways as the load is transferred to the platen 122. Obviously, a truck with side shifting provision may be utilized as shown in FIG. 18, or as shown in FIG. 14.

Figure 19:
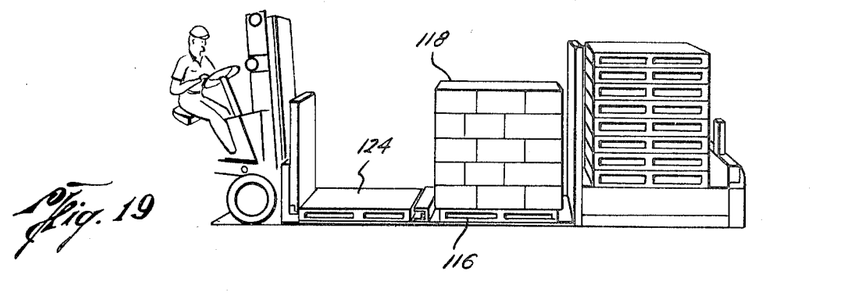

Referring briefly to FIG. 19, it is seen that the load 118 may also be transferred from platen 116 to a further platen 124. This type of transfer may be desirable for use of a customer's own pallet, a different size pallet, a different type of pallet, or the like. By the same token, the present invention may be modified to include a jaw at the switch bar 104 and thrust bar 106 to grip a paper pallet, or slipsheet, in a conventional manner, so that the load 118 may be deposited on the slipsheet which is supported by the platens of the lift truck.

Figure 20:
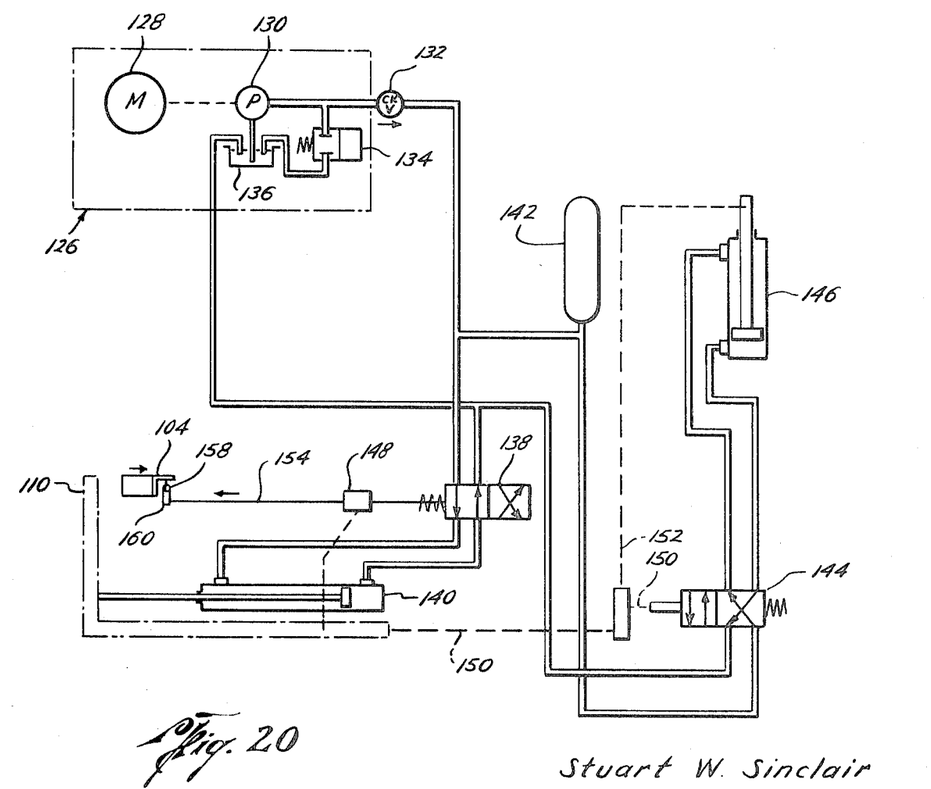
FIG. 20 is a schematic of the hydraulic circuit of the power-operated embodiment of the invention.

Referring now to FIG. 20, a schematic diagram of the hydraulic system utilized in the load transfer and pallet stacker 100 is shown. The hydraulic assembly generally includes a power unit 126 for supplying hydraulic fluid under pressure, and may include an electric motor 128 mechanically connected to a hydraulic pump 130. The output of the hydraulic pump 130 leads to a check valve 132 and to an unloader valve 134 which bypasses hydraulic fluid from the pump to the reservoir 136 after a preset pressure is obtained. Downstream from the check valve 132 is a spring-loaded valve 138 to which is connected the power cylinder 140 which ram is mechanically connected to the transfer plate 110. Also downstream from the check valve 132 is an accumulator 142 and a spring-loaded valve 144 to which is connected the lift cylinder 146 whose ram operates the elevator mechanism 112. The return lines from the respective rams also lead to the respective valves and thence to the reservoir 136. The switch bar 104 is mechanically connected to valve 138 by a cable, chain, pull bar or the like so that operation of the switch bar 104 by the lift truck 34 results in operation of the valve 138. The mechanical innerconnection may also include a mechanical interlock 148 to hold the valve 138 in its operating position during a portion of the cycle. The valve-operating mechanism 150 is mechanically connected to valve 144 and is operated upon retraction of the transfer plate 110.

Operation of the hydraulic circuitry will now be described in conjunction with previously described FIGS. 13 through 17. Valve 138 is normally shifted to the right, while valve 144 is normally to the left. When the lift truck 34 platens 120 engage the switch bar 104, valve 138 is moved to the left. This results in hydraulic fluid from the hydraulic power unit 126 flowing through check valve 132 to the head end of the power cylinder 140, causing the ram to extend, pushing the transfer plate 110 outwardly, as seen in FIG. 15. After shifting the load onto the platen, and when the truck 34 moves away from the switch bar 104, valve 138 is released, and the spring returns it to such a position that hydraulic fluid from the power unit 126 pulls the ram back into power cylinder 140, thus retracting the transfer plate 110. At the same time, the just unloaded platen 116 is pulled into the elevator unit.

When the transfer plate 110 is completely retracted, it engages the mechanical operator 150, which operates valve 144. This results in hydraulic fluid from the power 126 flowing through valve 144 to the elevator cylinder 146, raising the ram upwardly, thus moving the just unloaded platen 116 into the stack of pallets 114. When the elevator ram reaches its uppermost position, a mechanical interlock 152 is operated thereby, disengaging the mechanical operator 150, allowing the spring-loaded valve 144 to return to its right-hand position, thus lowering the ram in the elevator cylinder 146. The accumulator 142 shown in the circuitry is optional, and may be utilized to store a charge of hydraulic fluid for use during peak loads. If the hydraulic power unit 126 is made sufficiently large, then the accumulator 142 is not needed. The mechanical interlock 148 is also optional, and is included to hold valve 138 shifted to the left and continue the cycle of operation of power cylinder 140 ram after the transfer plate has moved a predetermined distance. This feature is useful when the load 118 being transferred is of a greater depth than the platen 120, thus requiring the lift truck operator to back up a bit and disengage from the switch bar 104 before the transfer plate 110 has fully extended. The mechanical interlock 148 is used to continue holding the valve 138 in its operative position until complete extension of the transfer plate 110 has been accomplished.

Figures 21, 22:
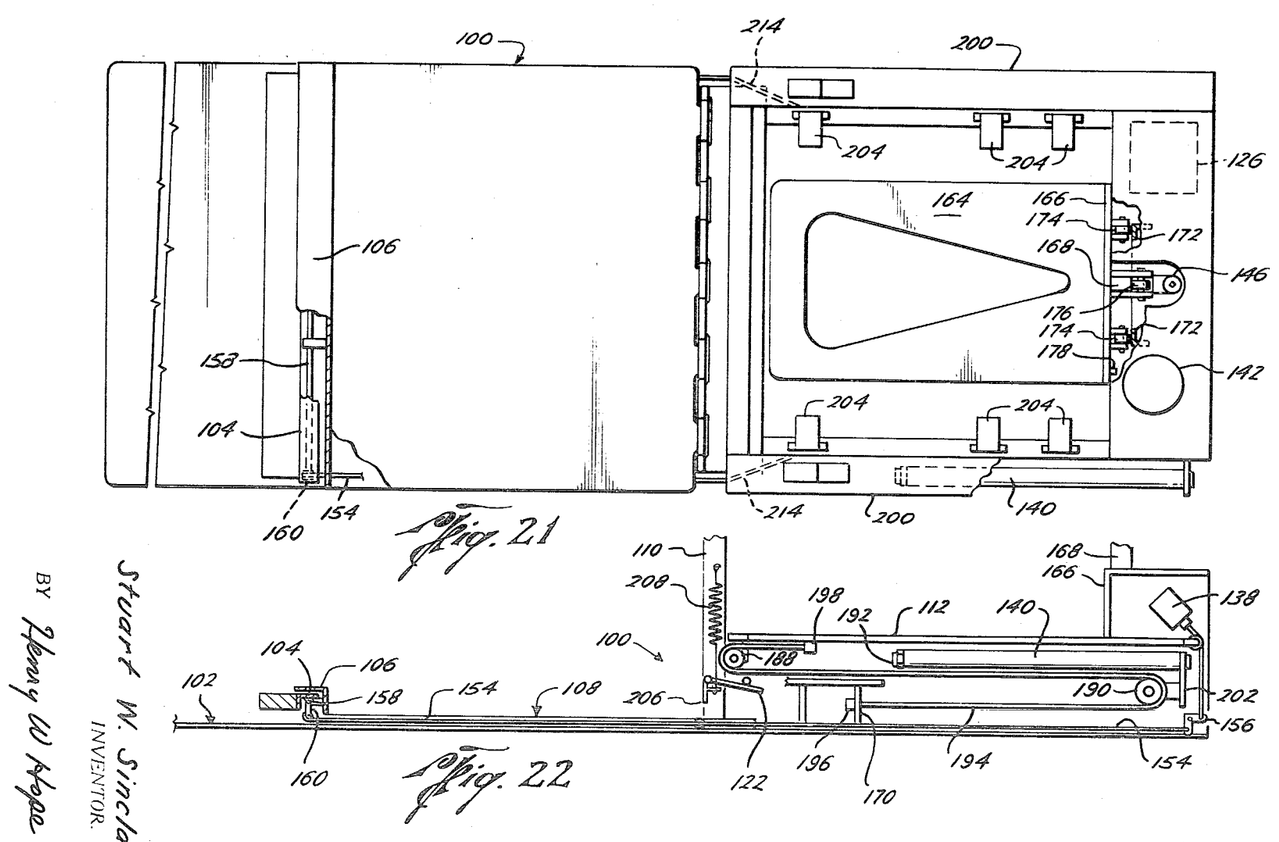
FIG. 21 is a top view of the power-operated embodiment.
FIG. 22 is a partial side view thereof.

Referring now to FIGS. 21 and 22, top and side views of the load transfer and pallet stacker 100 are shown. Pivotally attached to, and extending from the elevator assembly 112 is the receiving area plate 108, and extending from it is the traction plate 102. The traction plate 102, receiving area plate 108, and elevator assembly 112 are here shown joined together by means of piano-type hinges, which allow the unit to be easily moved from location to location by simply folding the receiving area plate 108 upwardly and the traction plate 102 downwardly. Obviously, other means of attachment could be utilized. The traction plate 102 always acts in tension, and hence may be a piece of ⅛-inch steel with grit, or the like, bonded thereon. At the outward end of the receiving area plate 108 is the switch bar 104 and thrust bar 106. The thrust bar 106 prevents further outward movement of the pallet 116 being unloaded, as a load 118 thereon is pushed over the top of the thrust bar 106. The switch bar 104 is here shown as a piece of wood slidably mounted beneath the thrust bar 106 and mechanically connected to the pull rod 154. The pull rod extends to the back of the elevator unit 112, and operates through a bellcrank 156 to operate hydraulic valve 138, as previously explained with reference FIG. 20. The pull rod 154 may constitute cable, rodding, or chain as suits the constructor, and is pulled outwardly by inward movement of the switch bar 104 by virtue of the pivot 158 and lever 160.

The transfer plate 110 is slidably mounted on the elevator assembly 112 and is moved outwardly by operation of the power cylinder 140. Notice that the power cylinder 140 is little more than one-half the length of the receiving area plate 108. Further, only power cylinder 140 is utilized. This is possible only because the present embodiment utilizes an intermediate carriage or equalizer assembly 162, better seen in FIG. 23, and described later.

Figures 23, 24, 25:
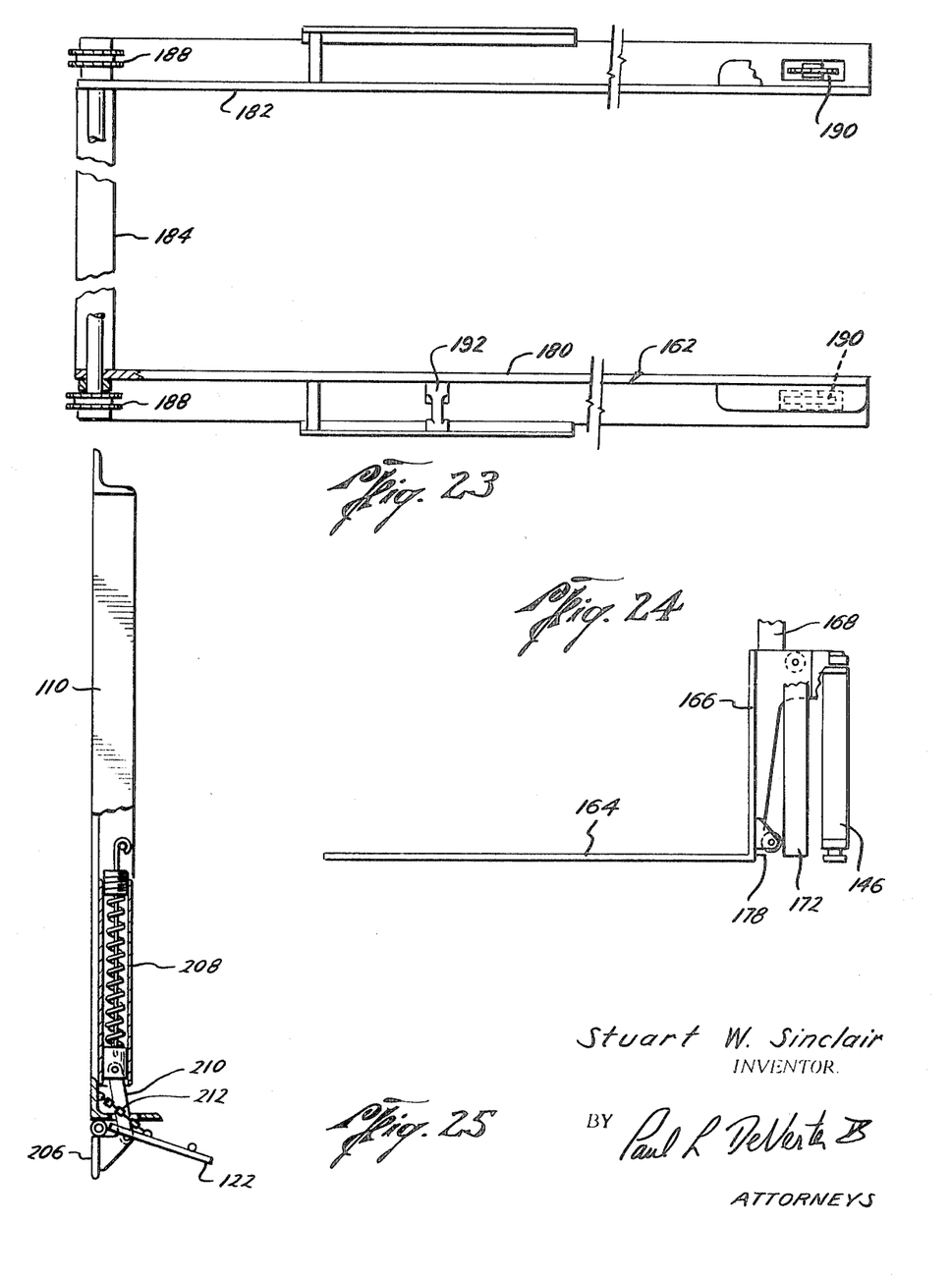
FIG. 23 is a partial top view of the equalizer assembly, or intermediate carriage.
FIG. 24 is a side view of the elevator unit.
FIG. 25 is a side view of the transfer plate details.

The elevator assembly 112 generally includes the lift plate 164 which is attached to a vertical backplate 166. The backplate 166 is in turn attached to the ram of the elevator cylinder 146, as seen in FIG. 24. A vertical guide 168 extends upwardly from the frame 170, as do side rails 172. Attached to the backplate 166 are rollers 174 which engage the side rails 172, and roller 176 which engages the vertical guide 168. These rollers and guides maintain the elevator plate 164 horizontal as it is moved upwardly by the elevator cylinder 146. Extending from the bottom of the vertical plate 166 is a trigger 178 which is utilized to actuate the mechanical interlock 152 shown in FIG. 20, releasing valve 144 when the elevator cylinder 146 ram has fully extended.

Referring now to FIG. 23, the intermediate carriage or equalizer assembly 162 generally comprises two longitudinal frame members 180 and 182 which are joined together by crossmember 184. Immediately above the crossmember 184 is a shaft 186 to which are attached sprockets 188 at each end. Rotation of either sprocket 188 rotates the other sprocket 188. At the opposite end of the equalizer assembly 162 are two additional sprockets 190 which are rotatably attached to the frames 180 and 182. The ram of the power cylinder 140 attaches to the equalizer assembly 162 by means of the bracket 192. As seen in FIG. 22, an elongate chain 194 is attached at one end 196 to the frame 170 and runs over sprocket 190 and then over sprocket 188 where it is attached at the other end 198 to the transfer plate guide 200. Identical chains are mounted on either side of the frame. The power cylinder 140 is attached to the frame as shown by the bracket 202.

It is now readily seen that actuation of the power cylinder 140 results in its ram moving the equalizer assembly 162 outwardly at the same speed as the ram. However, through the chain arrangement, the transfer plate guide 200, hence the transfer plate 110 is moved out at twice the speed of the equalizer assembly 162. Further, the sprockets 188 and shaft 186 prevent twisting of one of the transfer plate guides 200 with respect to the other, thus requiring both sides of the transfer plate to move outwardly at the same time. Thus, it is seen that the equalizer assembly 162 prevents racking of the transfer plate, enables the use of a power cylinder having little more than half the needed stroke of the transfer plate, and allows the use of a single power cylinder 140 instead of one on each side of the unit.

As seen in FIG. 21, extending over the elevator area are a series of dogs 204 which are pivotally attached to the frame 170. These dogs normally extend horizontally and support the stack of empty pallets 114 resting thereon. However, when the elevator assembly 112 is actuated, causing the plate 164 to rise vertically, the dogs 204 pivot upwardly, and once the unloaded pallet 116 has moved there above, they fall down to their horizontal position, preventing the now unloaded pallet 116 from moving there below. Various dogs 204 may be placed in suitable positions for different sized pallets.

Depending downwardly and pivotally attached to the bottom of the transfer plate 110 are the pallet push plate 206 and the pullback plate 122. As seen in FIG. 25, the push plate 206 is pivotally attached and held in a vertical position by the spring assembly 208 and lever 210. The function of the push plate 206 is to move the unloaded pallet 116, as seen in FIG. 14, over to the thrust bar 106 prior to the load 118 being transferred to the lift truck platen 120. After the pallet 116 has engaged the thrust bar 106, the push plate 206 pivots upwardly and rides over the top of the pallet 116. The spring assembly 208 may be adjustable for this purpose. Also depending from the transfer plate 110 is the pull plate 122, which is also pivotally attached to the transfer plate. A chain 212, or any other suitable rotation limitor, is utilized to limit downward movement of the pull plate 122. As seen in FIG. 15, the pull plate 122 rides over the top of the platens 116, and over the top of a small portion of the thrust bar 106. Then, as the transfer plate 110 begins to retract, the pull plate 122 falls down and engages the now empty pallet 116, and pushes it back onto the elevator plate 164. A suitable guide 214, as shown in FIG. 21, may be utilized on each side of the frame 170 to help center the now empty pallet 116 over the elevator plate 164.

Thus, it is seen that the present invention has provided a pallet transfer and stacker which is particularly useful in unloading loaded pallets onto the platens of a lift truck, and then stacking the now unloaded pallets in a vertical pile. The present invention, therefore, is well adapted to carry out the objects and attain the ends and advantages mentioned, as well as others inherent therein. While presently preferred embodiments of the invention have been given for the purpose of disclosure, numerous changes in the details of construction, and the combination, shape, size and arrangement of parts and order of steps may be resorted to without departing from the spirit and scope of the invention as hereinafter claimed.

What is claimed is:

1. A load transfer and pallet stacker for use in transferring a load from a pallet to a load-receiving surface and stacking the unloaded pallet, including:
   a transfer member arranged to receive the loaded pallet,
   a thrust bar extending upwardly from one end of the transfer member, the height of the thrust bar being less than the height of the pallet to be unloaded,
   a vertically disposed load-contacting plate generally situated at the other end of the transfer member and arranged to move toward the thrust bar,
   horizontal guides extending from the plate and arranged to guide the plate when moving toward the thrust bar,
   an elevator unit which receives and vertically stacks the unloaded pallet,
   pivoted dogs mounted on the elevator unit arranged to pivot upwardly to allow upward vertical passage of the unloaded pallet and to prevent downward passage thereof,
   the elevator unit including lift means arranged to lift the unloaded pallet upwardly past the pivoted dogs,
   means to move the load-contacting plate relatively toward the thrust bar, while maintaining the plate parallel to the thrust bar, and to transfer the load from the pallet over the thrust bar to the load-receiving surface,
   means to move the unloaded pallet from the transfer member into the elevator unit as the plate returns to its original position, and 2. A load transfer and pallet stacker for use in transferring a load from a pallet to a load-receiving surface and stacking the unloaded pallet, including:

a transfer unit, operation of which slides the load from the pallet onto a load-receiving surface, and an elevator unit which receives and vertically stacks the unloaded pallet, the transfer unit including a vertically disposed load-contacting plate, means for sliding the pallet to be unloaded beneath the plate to remove the load from the pallet onto the load-receiving surface, and for moving the unloaded pallet into the elevator unit, horizontal guides extending from the plate, an intermediate carriage slidably disposed on the guides, equalizer means interconnecting the plate, carriage and transfer unit arranged to prevent racking of the plate as it is moved relative to the pallet, a hydraulic power motor interconnecting the transfer unit and the intermediate carriage, the elevator unit including lift means arranged to lift the unloaded pallet upwardly, a hydraulic lift motor interconnecting the lift means and the elevator unit, and hydraulic lines and valves interconnecting the power motor and lift motor for actuation thereof.

3. The invention of claim 2 including:

a traction plate onto which a lift truck which has a load-receiving surface thereon is driven, said traction plate being attached to the transfer unit.

4. A load transfer and pallet stacker for use in transferring a load from a pallet to a load-receiving surface and stacking the unloaded pallet, including:

a transfer member arranged to receive the loaded pallet, a thrust bar extending upwardly from one end of the transfer member, the height of the thrust bar being less than the height of the pallet to be unloaded, a vertically disposed load-contacting plate generally situated at the other end of the transfer member and arranged to be moved toward the thrust bar, operation of which slides the load from the pallet over the thrust bar onto a load-receiving surface, horizontal guides extending from the plate and arranged to guide the plate when moved toward the thrust bar, an intermediate carriage slidably disposed on the guides, equalizer means interconnecting the plate, carriage and transfer member arranged to prevent racking of the plate as it is moved toward the thrust bar, a hydraulic power motor interconnecting the transfer member and intermediate carriage, an elevator unit which receives and vertically stacks the unloaded pallet, the elevator unit including lift means arranged to lift the unloaded pallet upwardly, a hydraulic lift motor interconnecting the lift means and elevator unit, a hydraulic power unit supplying hydraulic fluid selectively to the hydraulic motors, switch means associated with power unit, hydraulic lines and valves interconnecting the power unit, power motor and lift motor whereby upon operation of the switch means, the power motor extends the load-contacting plate to transfer the load from the pallet over the thrust bar, retracts the load-contacting plate to transfer the pallet into the elevator unit and the lift motor lifts the pallet vertically, and interlocks to sequence the operation of the hydraulic motors.

5. The invention of claim 4, including:

pull means extending downwardly from the load-contacting plate arranged to overrun the unloaded pallet as the load-contacting plate is extended and to pull the pallet into the elevator unit as the load-contacting plate is retracted.

6. The invention of claim 5, including:

pivoted dogs mounted on the elevator unit arranged to pivot upwardly to allow upward passage of the unloaded pallet and to prevent downward passage thereof, the lift means arranged to lift the unloaded pallet upwardly past the pivoted dogs.

7. The invention of claim 5, including:

a push plate extending downwardly from the load-contacting plate arranged to push the loaded pallet against the thrust bar.

* * * * *